United States Patent [19]

Schlosser et al.

[11] Patent Number: 5,245,917
[45] Date of Patent: Sep. 21, 1993

[54] SKEWER ASSEMBLY INCORPORATING A COUNTERBALANCING DEVICE

[75] Inventors: Erich J. Schlosser, Barrington; J. Michael Alden, Palatine, both of Ill.

[73] Assignee: Weber-Stephen Products, Co., Palatine, Ill.

[21] Appl. No.: 681,043

[22] Filed: Apr. 5, 1991

Related U.S. Application Data

[63] Continuation-in-part of Ser. No. 392,123, Aug. 10, 1989, abandoned.

[51] Int. Cl.⁵ .............................................. A47J 37/04
[52] U.S. Cl. .................................. 99/419; 99/421 H; 73/468; 73/469; 74/573 R
[58] Field of Search ................ 99/419, 421 R–421 V; 74/573 R, 469; 73/468, 469

[56] References Cited

U.S. PATENT DOCUMENTS

| | | | |
|---|---|---|---|
| 2,377,096 | 5/1945 | Nichols | 74/573 |
| 2,494,756 | 1/1950 | Gruetjen | 74/573 |
| 3,442,202 | 5/1969 | Ishida | 99/421 R |
| 3,720,157 | 3/1973 | Van Bergen | 99/421 H |
| 3,960,067 | 6/1976 | Dutchburn | 99/421 H |
| 4,476,777 | 10/1984 | Dutchburn | 99/421 H |
| 4,561,035 | 12/1985 | McDorman et al. | 74/573 X |

Primary Examiner—Harvey C. Hornsby
Assistant Examiner—Patrick F. Brinson
Attorney, Agent, or Firm—Wallenstein, Wagner & Hattis, Ltd.

[57] ABSTRACT

A skewer assembly (12) that incorporates a counterbalancing device (42) for use with a barbecue grill (10) or other rotisserie assembly includes a generally rectangular shaft (20) that has a handle (22) releasably secured to one end thereof through a releasable end piece (24). The counterbalancing device (42, 42a) has a counterweight (15, 62) on one free end thereof and an elongated slot (48, 60) intermediate opposite ends. A threaded stud (32) forming part of and extending outwardly from the main body (30) of the end piece (24) is threaded through the elongated slot (48,60) of the counterbalancing device (42,42a) and into a threaded opening (34a) extending inwardly into the shaft (20) to frictionally grip the counterbalancing device (42,42a) between an abutment (40) on the handle (22) and an abutment (36) on the end piece (24).

2 Claims, 2 Drawing Sheets

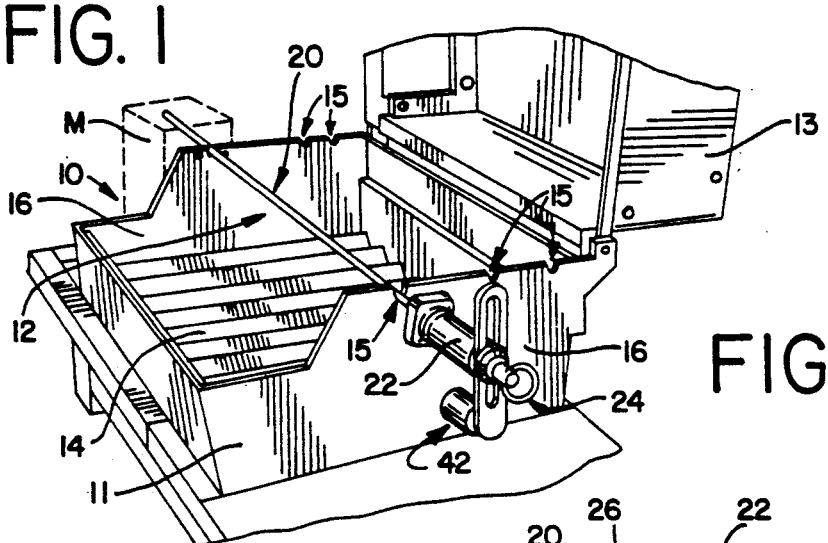

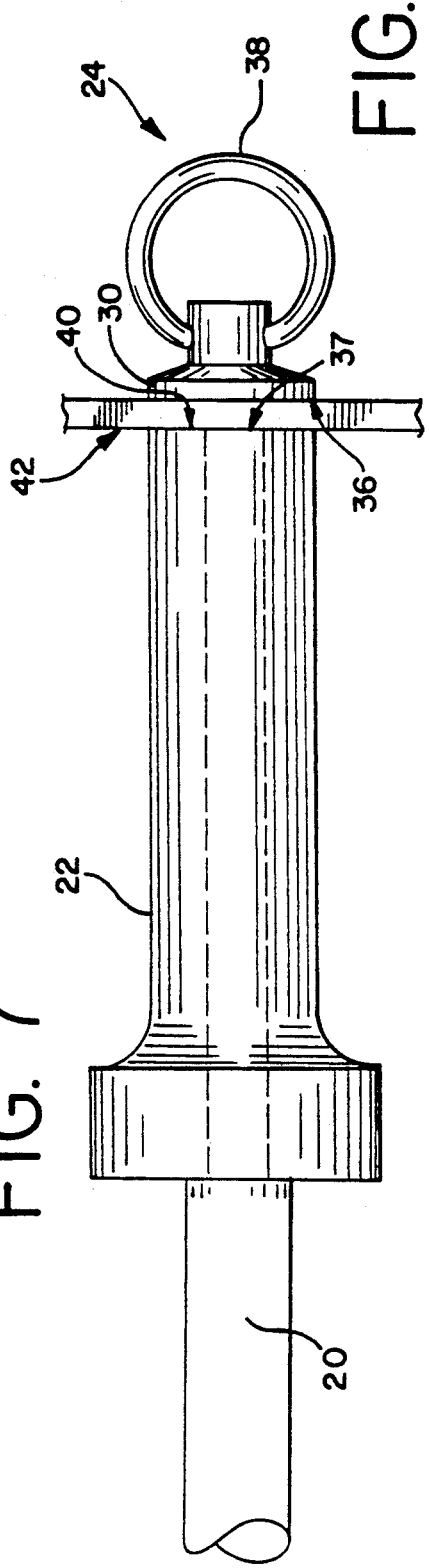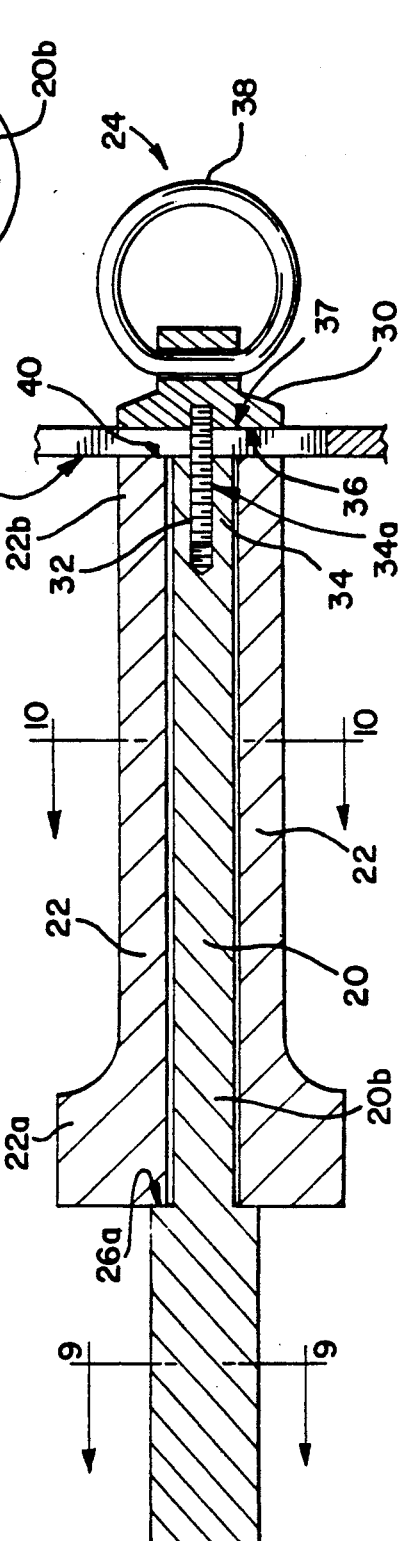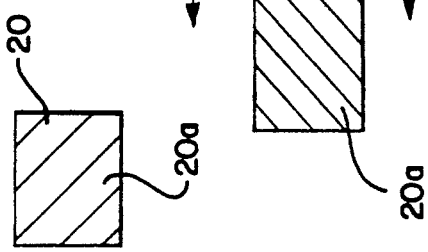

SKEWER ASSEMBLY INCORPORATING A COUNTERBALANCING DEVICE

REFERENCE TO RELATED APPLICATIONS

This is a continuation-in-part application of U.S. Ser. No. 392,123, filed Aug. 10, 1989, now abandoned.

TECHNICAL FIELD

The present invention relates generally to counterbalancing devices attachable to a rotatable shaft to provide an even weight distribution with respect to the longitudinal axis of the shaft and, more particularly, it relates to a counterbalance device for use with a skewer or spit that can be used in conjunction with outdoor barbecue grills so as to form a rotisserie.

BACKGROUND PRIOR ART

Rotisserie devices are commonly used particularly in outdoor cooking such as cooking with a barbecue grill. These devices usually consist of a shaft which is rotatably supported at opposite ends and has the food supported thereon. The food or weight of the object carried by the skewer's shaft is preferably distributed evenly radially about the shaft. This even distribution of the weight radially around the shaft is necessary so as to not place undue restraint on the drive motor which is normally utilized for rotating the shaft.

Various types of counterbalancing mechanisms have been developed primarily for use and providing an even radial distribution of the weight of a rotating rotisserie and examples of such devices are disclosed in U.S. Pat. Nos. 3,960,067 and 4,476,777. While these devices may provide the necessary counterbalancing weight for compensating for the uneven distribution of the object supported on the spit or skewer for cooking purposes in a rotisserie, these devices incorporate a number of parts which easily can be lost and thus make the devices unusable without necessitating a trip to the local hardware store.

Thus, there remains a need for a counterbalancing system for use in conjunction with a spit or a skewer which can be fabricating with a minimum number of parts and which requires minimal additional expenditures.

SUMMARY OF THE INVENTION

According to the present invention, a skewer assembly for use with a barbecue grill or other type of rotisserie incorporates a counterbalancing mechanism that can be attached to the rotating shaft of the skewer through the use of fastening devices which also form part of the means to secure the handle to the skewer. More specifically, the skewer assembly incorporates a shaft that has a handle around a portion of the shaft at one end; the handle is releasably attached to one end of the shaft through a releasable fastener.

According to the present invention, the counterbalancing device incorporates a simple weight mechanism which can be attached to the shaft through the same fastener means that is used for securing the handle thereto.

In the specific illustrated embodiment, the counterbalancing device is preferably in the form of a counterweight member that extends radially of the shaft's longitudinal axis and has a slot with weight means on one of the ends. The handle for the assembly and the counterbalancing means are preferably secured to the shaft through the use of a common fastener, an end piece, that consists of a threaded stud which extends through the slot of the counterbalancing device and into a threaded opening in the end of the shaft at the handle end of the shaft.

The threaded stud is an integral part and extends outwardly from a main body portion of the end piece. The handle preferably has an abutment at its inner end that engages a flange, or an abutment, on the rotating shaft that is located a spaced distance from its internally threaded end. At the opposite end of the handle, namely the outer end of the handle, there is an abutment that aligns with a corresponding abutment on the main body portion of the end piece. The counterweight member is frictionally engaged and supported between the abutment on the end piece and the abutment at the outer end of the handle. When the threaded stud of the end piece is tightened into the threaded opening in the shaft, both the handle and the counterweight member are secured to the shaft. On the other hand, when the stud is loosened from the cooperating opening in the shaft, the handle loosens and the counterweight can be adjusted relative to the longitudinal axis of the shaft. In this manner, the counterweight member can be repeatably adjusted to the desired position and held in the desired position to accommodate different foods being cooked on the skewer.

In one embodiment of the invention, the counterweight device includes a rod that is bent between opposite ends to define an elongated slot with opposite ends of the rods supporting the weight means upon the free end of the counterweight device. In an alternate embodiment, the counterweight device includes a flat plate that has an intermediate slot with the weight means secured to one end of the plate.

BRIEF DESCRIPTION OF DRAWINGS

FIG. 1 is a perspective view of a barbecue grill having the skewer assembly incorporating a counterbalancing device supported thereon;

FIG. 2 is a side view of the skewer assembly incorporating a counterbalancing device shown in FIG. 1;

FIG. 3 is an end view of the skewer assembly as viewed along the line 3—3 of FIG. 2;

FIG. 4 is a perspective view of the handle end of the skewer assembly incorporating a modified form of the counterbalancing device;

FIG. 5 is a side elevation view of the skewer assembly incorporating the modified counterbalancing device shown in FIG. 4;

FIG. 6 is an end view as used along line 6—6 of FIG. 5;

FIG. 7 is an enlarged side elevation view of the handle end of the skewer assembly;

FIG. 8 is an enlarged side sectional view of the handle end of the skewer assembly;

FIG. 9 is a sectional view of the rod of the skewer assembly along line 9—9 of FIG. 8; and, FIG. 10 is a sectional view of the rod and handle of the skewer assembly along line 10—10 of FIG. 9.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

FIG. 1 of the drawings shows an outdoor cooking device for barbecue grills, generally designated by reference numeral 10, having the skewer assembly 12 incorporating a counterbalancing device 14 constructed in accordance with the present invention supported thereon. The barbecue grill may be of the type disclosed in U.S. Pat. No. 4,677,964, assigned to the Assignee, Weber-Stephen Products Co., of the present invention and incorporated herein by reference. The grill 10 shown includes a housing having a lower portion 11 with a cover 13 hingedly secured thereto. The heating element 14, such as a burner assembly with a sear grid arrangement, is positioned in the lower portion 11 of the grill 10. A cooking grid (not shown) can be positioned above the heating assembly. Of course, while one grill is shown in the drawings, it is recognized that various other types of circular or rectangular barbecue grills that incorporate burner elements, such as sears bars, charcoal or lava rocks can be easily adapted to the skewer assembly 12 incorporating a counterbalancing device 42 constructed in accordance with the present invention.

The skewer assembly incorporating a counterbalancing device, or alternately, an improved rotisserie spit, 12 incorporates four primary components, being a rotatable shaft 20, a handle 22, an end piece or connector 24, and a counterbalancing device 42.

The improved rotisserie spit 12 includes a generally rectangular rod or shaft 20 that extends through a handle 22 secured to one end thereof. The other end of the shaft 20 is free. However, in the preferred embodiment, a motor M (shown in phantom lines in FIG. 1) is positioned and secured adjacent a side of the lower portion 11 of the grill and is provided with an opening for receiving the free end of the shaft 20. Opposed channels 15 are provided in the side walls 16 of the lower portion 11 of the grill 10 to receive the shaft 20 of the improved spit 12. Thus, the object to be cooked can be pierced with the shaft 20 and the shaft can be inserted into the opening provided by the motor M and placed into the opposed channels 15 in the side walls 16, and positioned so that the handle 22 remains outside the housing 10. Thus, with cover 13 closed and the motor M turned on, the food can be evenly cooked and the juices permitted to flow around the food while it rotates.

Alternatively, it is not necessary to employ a motor M. The free end of the shaft 20 can remain free and the object to be cooked rotated by hand by merely gripping the handle 22 of the improved spit 12. With the assembly 12 as hereinafter described, the uneven radial distribution of weight of the object to be cooked can be compensated for with the counterbalancing device 42. Accordingly, the object can be turned and left alone; and it will not rotate in an undesirable manner.

The handle 22 is preferably releasably retained and secured on a portion of the shaft 20 through a connection means 24. As shown in FIG. 2, preferably the shaft 20 has a flange means or an abutment 26, that is defined at a location spaced from the end of the shaft 20 with the handle 22, engaging the handle 22. The abutment 26 can be in the form of flange means welded to the rod 20 or can be formed by deforming the rectangular rod.

As is shown in detail in FIGS. 8, 9 and 10, the shaft 20 can be made to have two portions 20a, 20b. The first portion 20a is at the free end wherein an object is skewered and wherein a motor M can be attached. This first portion 20a is preferably rectangular in cross section (FIG. 9). The second portion 20b is preferably circular in cross section (FIG. 10) and is formed by cutting away a portion of material from the rectangular rod. Accordingly, an abutment 26a is formed where the circular section 20b ends and where the rectangular section 20a begins. Thus, the handle 22 is secured to the rod 20 between the abutment 26a on the rod and the end piece or connecting member 24. The abutment 26a engages one end of the handle 22, the inner end 22a, and the end piece 24 engages the outer end 22b of the handle 22 to cooperate and frictionally hold the handle around the end portion of the shaft 20.

At one end 34 of the rotatable, horizontal shaft 20, namely the end with the handle 22 secured to it, there is an end abutment 37 and a threaded opening 34a extending therein for cooperating with a threaded stud 32 that is extending outwardly from the main body portion 30 of the end piece 24.

In particular, the connecting means or end piece 24 preferably is in the form of a main body portion 30 that has a threaded stud 32 extending outwardly therefrom that cooperates with and is received in the threaded opening 34a in threaded end 34 of rod 20. The main body portion 30 also has a generally flat abutment 36 that is aligned with the shaft abutment 37 when the end piece 24 and the shaft 20 are mated. In addition, the main body portion 30 has a gripping handle portion 38 secured to the side of the body that is opposite that of the stud 32 so that the entire connector 24 can readily be loosened from the threaded rod end 34 and rethreaded. This handle portion 38 can also be used to hang the skewer 12 for storage.

The handle 22 fits around the threaded opening 34a and has both an inner end 22a and an outer end 22b. The outer end 22b of the handle 22 also has an abutment 40 that is generally aligned with the abutment 36 of the main body portion 30 of the end piece 24. Accordingly, by having the longitudinal length between the flange 26 or 26a on the shaft 20 and the shaft abutment 37 at the end of the shaft shorter than the longitudinal length of the handle 22, a snug fit of the handle is ensured around the shaft when the end piece 24 is tightened on to the end of the shaft.

Thus, the handle 22 is frictionally held between the shaft abutment 26 or 26a and the abutment 36 of the main body portion 30 of the end piece 24.

In addition, not only is the handle 22 secured to the shaft by the end piece 24, but also, the counterbalancing mechanism 42 or 42a of the present invention is preferably frictionally gripped adjacent the handle end of the shaft between the abutments 36 and 40 on the end piece 24 and on the end of the handle 22. The counterbalancing means 42 or 42a extends radially the axis of the shaft 20. The counterbalancing means has weight means at one end thereof with the weight means being radially adjustable relative to the shaft and being held in the desired adjusted position with respect to the shaft.

In particular, in the embodiment illustrated in FIGS. 1-3, the counterbalancing device or means 42 consists of a generally elongated flat plate 46 which has an elongated slot 48 intermediate opposite ends thereof and a weight means or counterweight 50 on a free end thereof. The counterbalancing device 42 is designed to extend radially of the shaft 20 and handle 22 and is adjustable to adjust the radial spacing of the counterweight 50 with respect to the axis of the shaft. For this purpose, it is only necessary to release the frictional gripping force provided by the tightened end piece 24 and slide the counterweight to the desired position. The end piece 24 is then rotated to frictionally grip the counterbalancing mechanism 42 between the aligned abutments 36 and 40 that are respectively located on the end piece 24 and the handle 22. Thus, a very simple mechanism has been provided which can easily be worked. Adjustments can be made repeatably to the counterweight so as to compensate different objects being cooked and skewered. Additionally, the entire skewer assembly can be easily taken apart for cleaning and re-assembled for further use. Further, by having the free end 20a of the shaft 20 the same rectangular shape as presently manufactured skewers and by having the skewer assembly substantially the same overall length of presently manufactured skewers, the skewer assembly of the present invention can be used with present manufactured motors M, present barbecue grills and present rotisserie systems.

A slightly modified form of counterbalancing means 42a is illustrated in FIGS. 4, 5 and 6. The embodiment illustrated therein is substantially similar in function and operation as the prior embodiment shown in FIGS. 1-3 and is designed to further minimize the fabrication costs.

Thus, as illustrated in FIG. 4, the counterbalancing means or device consists of a generally circular rod 50 that is bent to a generally U-shaped configuration between opposite ends to define two legs 54 and 56 that are interconnected by a bite portion 58. The two legs 54 and 56 thus define an elongated slot 60 with the counterweight means 62 secured to the free ends 70 of the legs 54 and 56. Preferably the free ends 70 of the legs 56,54 are offset angularly and the ends thereof are deformed to extend perpendicular to the elongated slot 60. Thus, the counterweight 62 can easily be assembled onto the rod 50 by inserting the ends 70 of the legs 54 and 56 into apertures 71 in opposite ends of the counterweight 62.

Again, the modified form of counterbalancing device 42a is interposed and frictionally gripped between the abutment 40 on handle 22 and the abutment 36 on the end piece.

Thus, in both embodiments of the invention, the counterbalancing device 42 or 42a can easily be adjusted relative to the shaft 20 without any modification thereof. It is only necessary to loosen the threaded stud 32 of the end piece 24 from the threaded opening 34 of rod 20 and insert the threaded stud 32 through either the slot 48 or the slot 60 and then refasten, by rethreading, the end piece 24 to frictionally engage and grip the counterbalancing mechanism 42 or 42a between the respective abutments 36 and 40 on the main portion 30 of the end piece and of the handle 22.

It should be noted that in both embodiments of the invention, the counterweight 50 or 62 is circular in cross section and thus there is no need for maintaining any specific position of the circular weight with respect to the counterweight mechanism 42 or 42a.

While a specific embodiment has been described, numerous modifications come to mind without departing from the spirit of the present invention. For example, the rectangular shaft could readily be a circular shaft are supported on the spaced ledges that form part of the grill 10. Also, a different type of connector could easily be utilized and the construction and arrangement of parts could readily be varied without departing from the spirit of the invention.

While the specific embodiments have been illustrated and described, numerous modifications come to mind without significantly departing from the spirit of the invention and the scope of protection is only limited by the scope of the accompanying claims.

We claim:
1. A skewer assembly comprising:
a horizontal rotatable shaft with a threaded opening extending inwardly from one end thereof and flange means thereon spaced from said one end thereof;
a handle member having an inner end and an outer end that fits around a portion of said shaft adjacent said one end of said shaft;
counterbalancing means adjacent said one end of said shaft extending radially from said shaft;
said counterbalancing means having a member with a slot therein and a weight fixedly secured at one end thereof with both said counterbalancing means and said weight being radially adjustable relative to said shaft and being releasably held in an adjusted position with respect to said shaft;
an end piece with an abutting surface thereon and a threaded stud extending therefrom through said slot in said counterbalancing means and cooperating with said threaded opening in said one end of said shaft for frictionally engaging said counterbalancing means between said one end of said shaft and said abutting surface of said end piece,
said flange means on said shaft cooperating with said inner end of said handle so as to secure said handle between said flange means and said abutting surface of said end piece; and, means on said end piece opposite said stud extending outwardly therefrom adapted to permit a user to easily grip and turn said end piece.
2. A skewer assembly comprising:
a cooking housing having a lower portion and a cover fitting thereon, said lower portion having side walls and a source of heat therein; and,
a skewer assembly supported on at least one said housing side wall, said skewer assembly including
a horizontal rotatable shaft with a threaded opening extending inwardly from one end and flange means thereon spaced from said one end, said shaft extending across said housing;
a handle member having an inner end and an outer end that fits around a portion of said shaft adjacent said one end of said shaft;
counterbalancing means adjacent one end of said shaft external of said housing and extending radially from said shaft,
said counterbalancing means having weight means fixedly secured thereto at one end thereof with both said counterbalancing means and said weight means being radially adjustable relative to said shaft and being releasably held in an adjusted position with respect to said shaft; and,
an end piece with an abutting surface thereon and a threaded stud extending therefrom through said slot in said counterbalancing means and cooperating with said threaded opening in said one end of said shaft for securing said counterbalancing means between said one end of said shaft and said abutting surface of said end piece; said flange means on said shaft cooperating with said inner end of said handle so as to secure said handle between said flange means and said abutting surface of said end piece; and,
means one said end piece opposite said stud extending outwardly therefrom adapted to permit a user to easily grip and turn said end piece.

* * * * *